(12) United States Patent
Higashida

(10) Patent No.: US 6,705,873 B2
(45) Date of Patent: Mar. 16, 2004

(54) CONTROLLER FOR USE WITH OPERATED OBJECT

(75) Inventor: Mitsuru Higashida, Tokyo (JP)

(73) Assignee: Thermal Co., Ltd., Tokyo (JP)

( * ) Notice: Subject to any disclaimer, the term of this patent is extended or adjusted under 35 U.S.C. 154(b) by 208 days.

(21) Appl. No.: 09/899,525

(22) Filed: Jul. 6, 2001

(65) Prior Publication Data

US 2003/0008709 A1 Jan. 9, 2003

(51) Int. Cl.[7] .............................................. G09B 25/00
(52) U.S. Cl. ...................... 434/393; 434/373; 446/456; 446/454; 446/436; 370/347; 340/825.69
(58) Field of Search ........................... 434/29, 61, 365, 434/372, 373, 393; 446/43, 91, 175, 270, 436, 441, 454, 456, 457, 460, 462, 468, 484; 463/39; 318/16, 293; 370/347; 340/825.69

(56) References Cited

U.S. PATENT DOCUMENTS

| | | | |
|---|---|---|---|
| 5,994,853 A | * | 11/1999 | Ribbe ........................... 318/16 |
| 6,171,172 B1 | * | 1/2001 | Foster et al. ................. 446/441 |
| 6,338,664 B1 | * | 1/2002 | Wong .......................... 446/468 |
| 6,390,883 B1 | * | 5/2002 | Choi ........................... 446/436 |
| 6,439,956 B1 | * | 8/2002 | Ho .............................. 446/454 |
| 6,454,624 B1 | * | 9/2002 | Duff et al. ..................... 446/91 |
| 2002/0111116 A1 | * | 8/2002 | Rudell et al. .................. 446/91 |
| 2002/0163905 A1 | * | 11/2002 | Brabrand ..................... 370/347 |

* cited by examiner

Primary Examiner—Joe H. Cheng
(74) Attorney, Agent, or Firm—Arent Fox Kintner Plotkin & Kahn

(57) ABSTRACT

A controller for use with an operated object such as a model vehicle contains therein a memory. The movement of the model vehicle is stored in advance into the memory with each of push buttons in a keyboard unit of the controller. Once a "GO" button is pushed even during a manual operation, a signal to cause to perform the procedure stored in the memory is transmitted from an antenna which is provided in the controller. In this arrangement, the model vehicle can be subject to complicated operations even by an unskilled operator.

8 Claims, 6 Drawing Sheets

CONTROLLER FOR USE WITH OPERATED OBJECT

BACKGROUND OF THE INVENTION

1. Field of the Invention

The present invention relates to a controller which controls the running condition, for example, of a model of a motor vehicle (also called a model vehicle) which serves as an object to be operated (also called an operated object).

2. Description of Related Art

As a conventional controller, there has hitherto been known the following. Namely, a controller for a model vehicle, for example, contains therein actuators such as an electric motor for rotating wheels, an electric motor for steering, or the like. These actuators are connected to a receiver which is contained inside the model vehicle. A signal is wirelessly transmitted through media of radio waves or infrared rays from a controller which is set at a distance to thereby manually control the operations such as the speed, the steering angle, back and forth movement or the like of the model vehicle.

There is also known one which contains inside a model vehicle a memory means instead of a receiver. The model vehicle is traveled in accordance with a motion pattern which is stored in advance in the memory means, whereby an automatic operation of the model vehicle is performed.

In the above-described conventional controller in which the motion of the operated object is wirelessly controlled, the motion of the operated object largely varies depending on the operating capacity of an operator who operates or manipulates the controller. In other words, an operator skilled in the operation will be able to perform various kinds of operations, but an unskilled operator will be able to perform only limited kinds of simple and monotonous operations. As a result, the unskilled operator will soon lose his or her interest in the operation before he gets well acquainted with the operation. It follows that the operated object with a capability of performing wide variety of operations cannot be given chances of availing itself of its functions.

In case the operated object contains therein a control unit for performing an automatic operation, the operated object can be subject to complicated motions that cannot be attained by an unskilled operator. However, since the control unit must be contained inside the operated object, the freedom of design of the operated object is limited.

In view of the above-described disadvantages, the present invention has an object of providing a controller which even an unskilled operator can operate in a complicated manner without losing the freedom in design of the operated object.

SUMMARY OF THE INVENTION

In order to attain the above and other objects, the present invention is a controller for use with an operated object having a movable part and a receiver contained therein, the controller being operated to wirelessly transmit a signal to the receiver to thereby control an operation of the operated body. The controller comprises: memory means for storing in advance a signal to be transmitted to the receiver, the signal stored in the memory means being adapted to be transmitted to the receiver to perform an automatic control mode for controlling the movable part of the operated body. By containing the memory means inside the controller, the operated object can be automatically operated like in the conventional controller without the change in design.

Preferably, the controller further comprises a manual operation unit for performing a manual operation mode in which the movable part of the operated body is sequentially controlled, wherein the memory means stores a signal in a form of a manual operation procedure by the manual operation unit, the signal in the form of the manual operation mode being adapted to be transmitted to the receiver to perform a reproducing mode in which an operation at the time of manual operation mode is reproduced. The complicated motions can thus be easily stored in the memory means.

Furthermore, preferably the controller also comprises a display unit for displaying the signal stored in the memory means without transmitting the signal to the receiver, thereby performing a simulation mode in which a content of the signal is confirmed by means of display. The content of the operation can thus be checked without actually operating the operated object.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENTS

Figure 1:
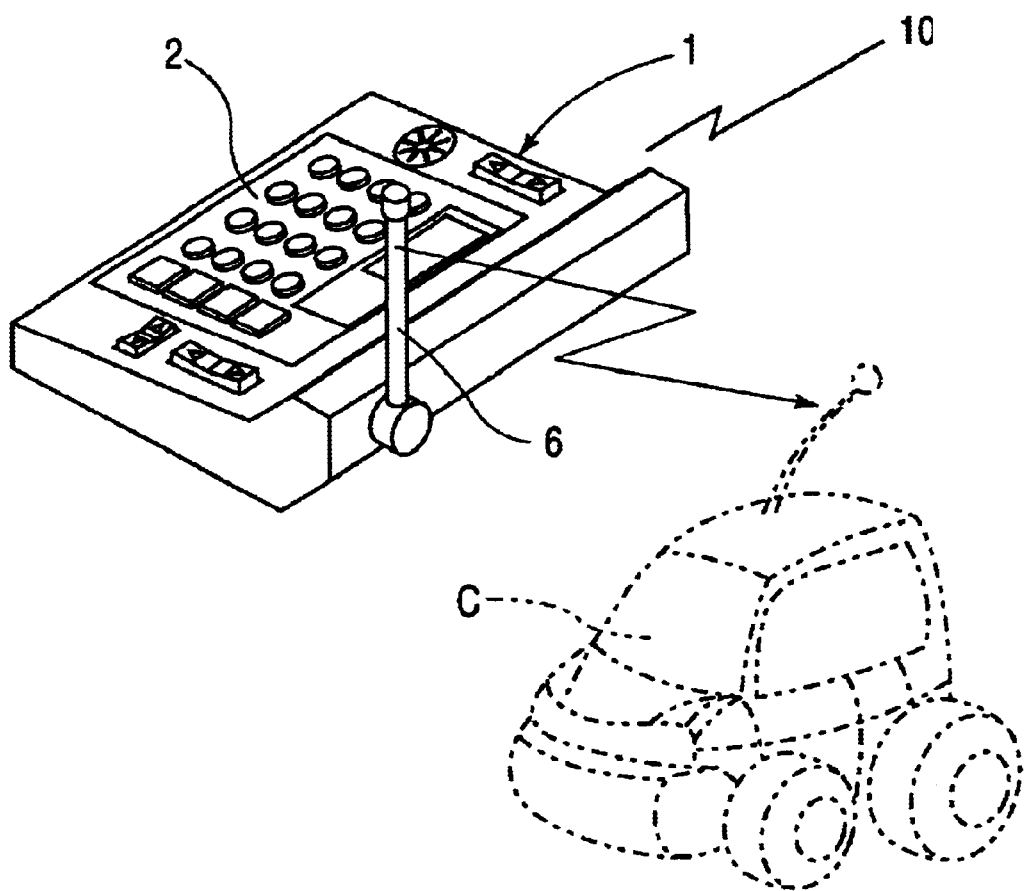
FIG. 1 is a perspective view of an example of the controller according to the present invention for use with a model vehicle.
Figure 2:
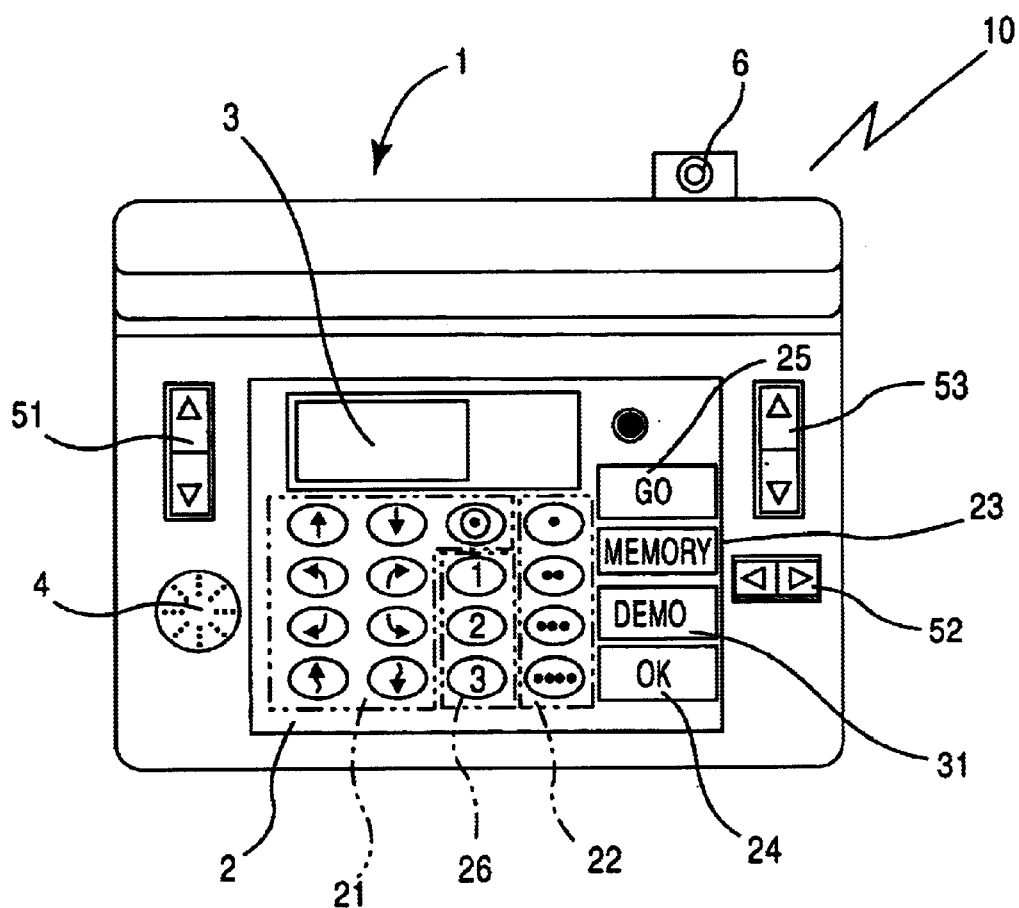
FIG. 2 is a plan view of an upper surface of the controller.

With reference to FIG. 1, reference numeral 1 denotes a controller having a housing 10 according to the present invention. This controller 1 controls various operations of a model vehicle C which is defined as an operated object. In the illustrated example, radio waves are transmitted from an antenna 6 to a receiver which is constrained inside the model vehicle C. Instead of radio waves, infrared rays, ultrasonic waves or the like may also be used as the media. With reference to FIG. 2, on an upper surface of the housing 10, there is provided a keyboard unit 2 or a keyboard portion 2. The keyboard unit 2 is provided with a group of operation buttons 21 corresponding to various operations of the model vehicle C and a group of time-of-continuation buttons 22 for setting the time-of-continuation of each of the operations. Inside the controller 1, there is contained a memory which is defined as a memory means. The operations which are set by the group of operation buttons 21 and the group of time-of-continuation buttons 22 are stored inside the memory. When a "MEMORY" button 23 is pushed, the operation of storing starts and the operation stops when an "OK" button 24 is pushed. When a "Go" button 25 is pushed, a signal corresponding to the stored operation is transmitted to the model vehicle C. The keyboard unit 2 has mounted thereon a liquid crystal display unit 3. When a "DEMONSTRATION" button 31 is pushed, the stored content is displayed on the liquid crystal display unit 3, instead of being transmitted to the model vehicle C. The keyboard unit 2 is further provided with a group of option buttons 26 to thereby assign thereto operations such as the actuation of a horn, the switching on of a tail lamp, or the like. In close proximity to the keyboard unit 2, there is provided a loud speaker 4 which generates sounds of an engine and of the horn during running of the model vehicle C. On an upper surface of the housing 10, there are further provided a switch 51 for back and forth movement and a switch for steering, both for manual operation. On an upper side of the steering switch 52 there is provided a second switch 53 for back and forth movement. The steering switch 52 and the second switch 53 for back and forth movement are set so as to be alternatively used. When the second switch 53 for back and forth movement is operated, the switch 51 for back and forth movement operates only the back and forth movement of the left wheels. The second switch 53 for back and forth movement therefore functions as a switch to perform the back and forth movement of the right wheels.

Figure 3:
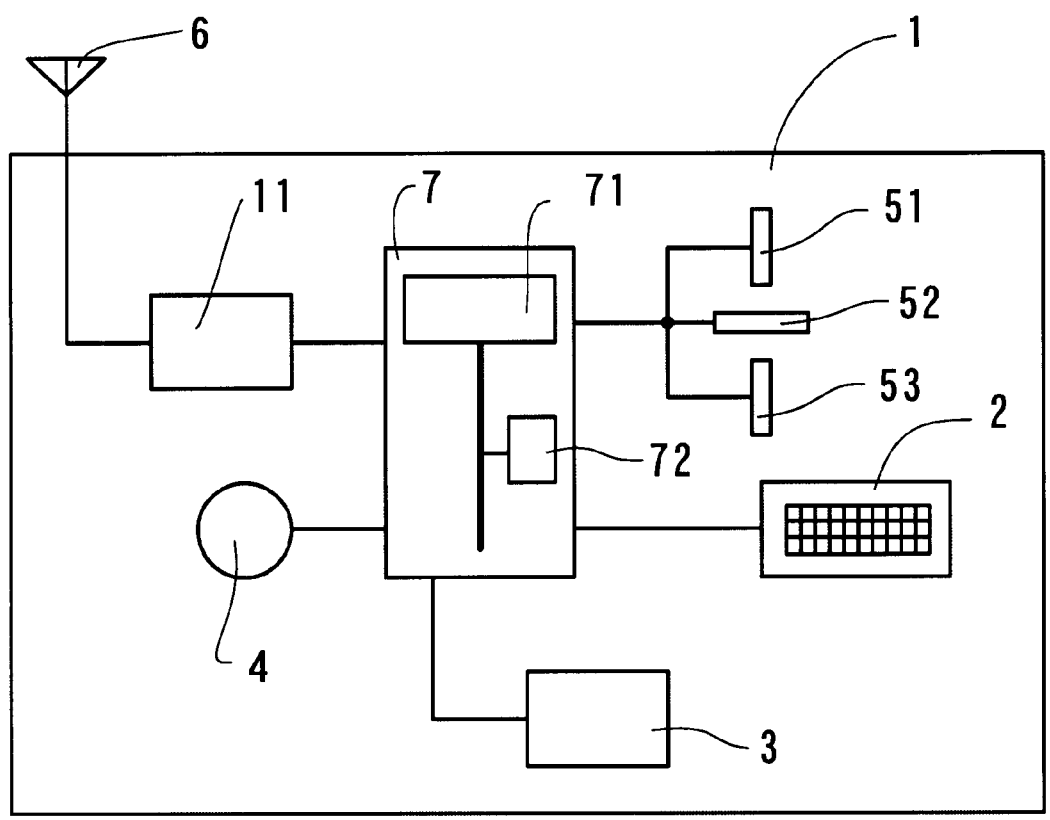
FIG. 3 is a block diagram showing an inner construction of the controller.

With reference to FIG. 3, the controller 1 contains therein a microcomputer-operated control unit 7 which contains therein a central processing unit (CPU) 71 and a memory 72 which is defined as the memory means. The signal to be outputted from the control unit 7 is converted by a transmitter circuit 11 into a radio-frequency signal for transmission from the antenna 6.

Figure 4:
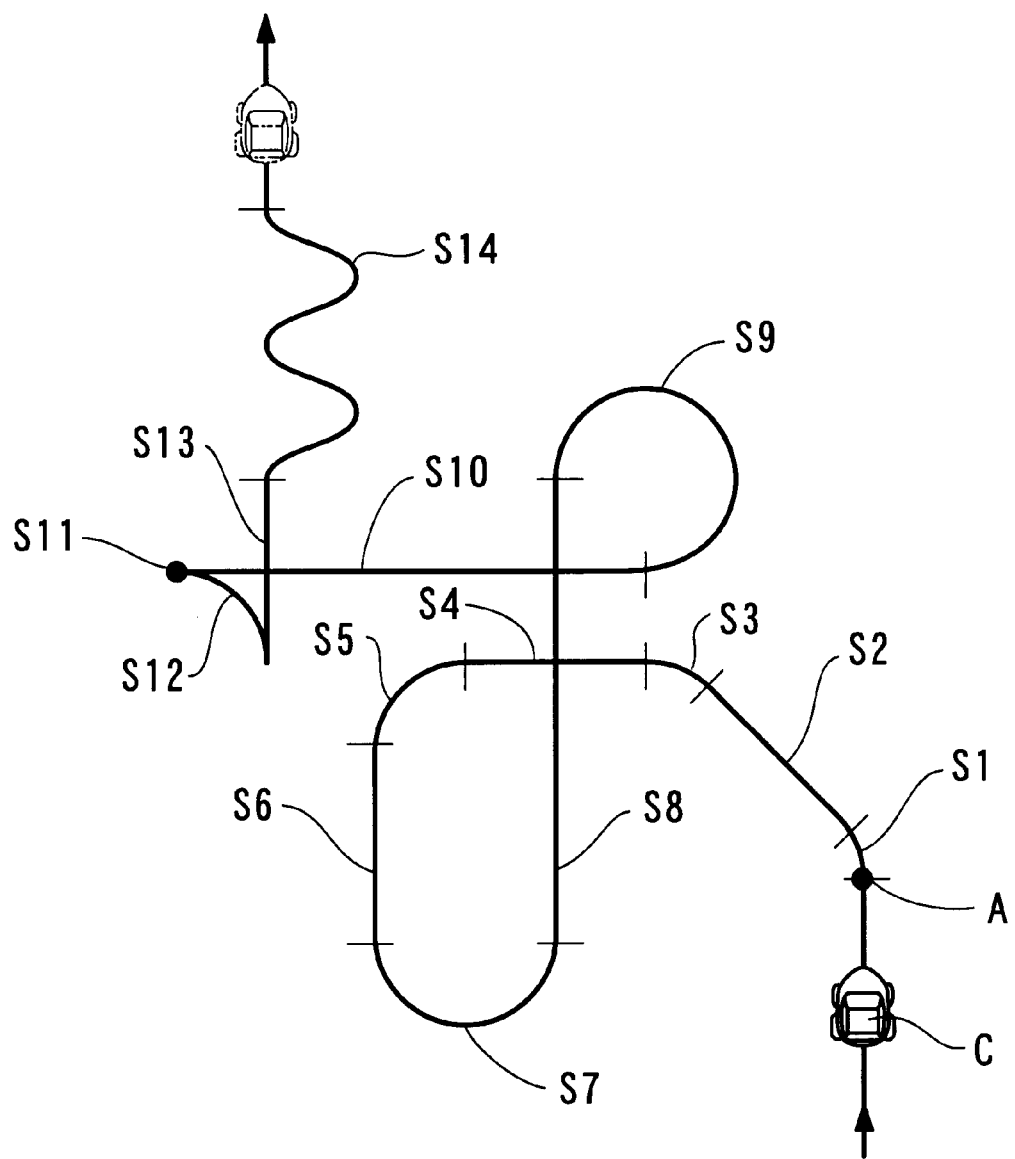
FIG. 4 is a diagram showing a running pattern of the model vehicle.
Figure 5:
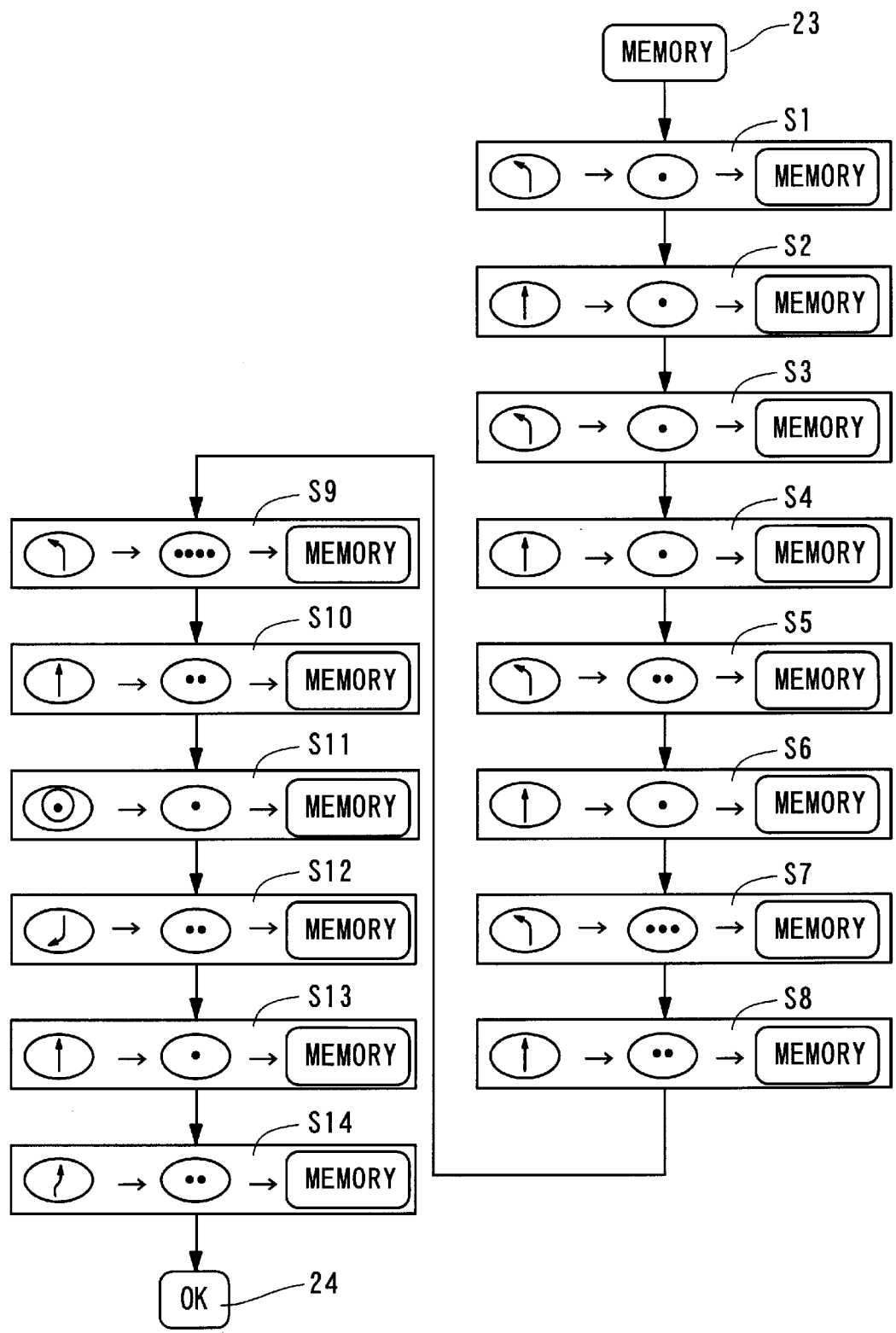
FIG. 5 is a step diagram showing the procedure of storing the running pattern.

An explanation will now be made about the steps of storing in the memory 72 the operation of traveling the model vehicle C along a stray path as illustrated, for example, in FIG. 4. With reference to FIG. 5, the "MEMORY" button 23 is pushed to start the storing in the memory 72. Then, the button corresponding to a left turn is pushed. Thereafter, out of the group of time-of-continuation buttons 22, the one with the shortest time of continuation is pushed. Finally, the "MEMORY" button 23 is pushed to store the operation of step 1 (S1). As a result of turning to the left for a short period of time, the course of the model vehicle C changes to the left at 45° as compared with the one at point A. Then, a straight-running button is pushed and an appropriate time-of-continuation button is pushed. Finally, the "MEMORY" button 23 is pushed to store the operation of step 2 (S2). Each of the time-of-continuation buttons 22 has affixed thereto a point mark such "•" and the larger the number of the point mark, the longer the time of continuation. The time of continuation is set such that the course of the model vehicle C changes by 45° as noted above with one point mark "•", 90° with two point marks, 180° with three point marks, and 270° with four point marks. At step 11 (S11) the movement of the model vehicle C once comes to a full stop. At the last step 14 (S14) the operation for snake-running is inputted and the "OK" button 24 is pushed to thereby finish the operation of storing. In the inputting operations as illustrated in FIG. 5, it is so arranged that the "MEMORY" button 23 is pushed at the end of each step. It is, however, not always necessary to do so; it may also be so programmed that, at the time when one of the time-of-continuation buttons 22 is pushed, the inputting of each step is finished.

Figure 6:
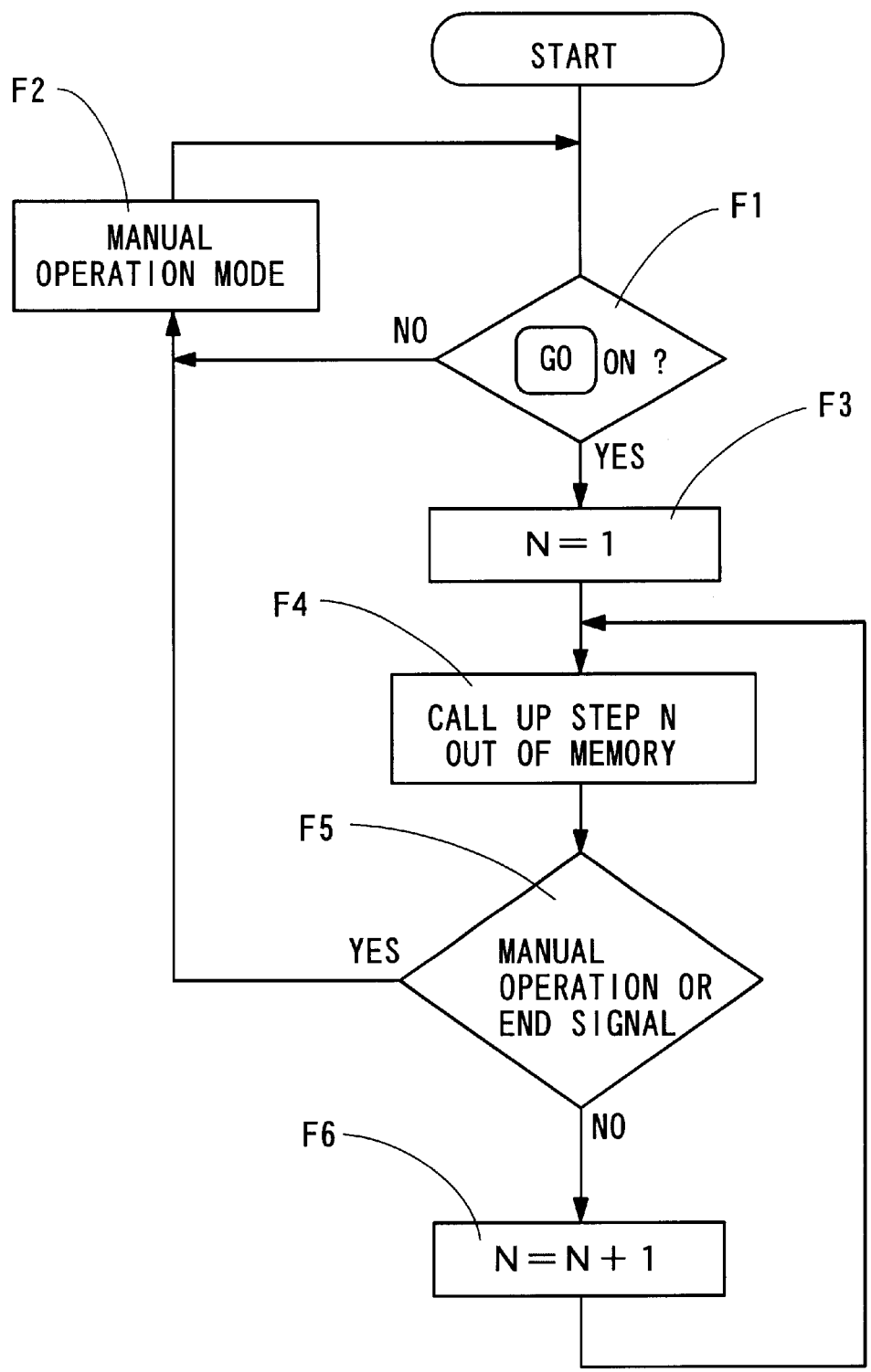
FIG. 6 is a flow diagram showing one example of control inside the controller.

As shown in FIG. 6, once a series of operations have been stored in the memory 72, a manual operation or manipulation by the switch 51 for back and forth movement and either the steering switch 52 or the switch 53 for back and forth movement is performed (F1, F2) until the "GO" button 25 is pushed. The model vehicle C thus runs according to the operation of the operator. Once the "GO" button 25 is pushed when the model vehicle C is running, the manual operation mode is immediately finished (F1) for switching to the automatic control mode (F3–F6). Once the switching has been made to the automatic control mode, a parameter N is first reset to 1 (F3). Then, the operation of step N, i.e., step 1, is called up out of the memory 72 and is transmitted to the model vehicle C. As a result, the model vehicle C turns to the left by 45°. By pushing the above-described "OK" button 24, the program proceeds from F5 to F6 unless an end signal is given or unless a manual operation corresponding to one of the switch 51 for back and forth movement, the steering switch 52, or the switch 53 for back and forth movement is performed. At step F6 1 is added to N and the program returns to step F4. It follows that the operation from step 1 (S1) through step 14 (S14) are sequentially transmitted from the controller 1. If the manual operation as described above takes place for interruption in the course of operation, or if the end signal is called up after finishing the transmission of the signals up to step 14 (S14), the program returns again to the manual operation mode (F5, F2). Until the "GO" button 25 is pushed again, the manual operation mode is continued. The time when the manual operation takes place in the course of the operation is when the model vehicle C must be returned to the original running line should the position of the model vehicle C become off the running line.

In the above-described explanations, the "MEMORY" button 23 is pushed once to store each of the operations into the memory 72. If the memory button 23 is pushed twice in succession, or if another trace button is pushed, the manual operations subsequently performed until the "OK" button 24 is pushed are sequentially stored in the memory 72. Then, if the "GO" button 25 is pushed thereafter, the mode will be changed to a reproducing mode for reproducing the earlier performed manual operation. The model vehicle C runs by reproducing the same movements as at the time of the manual operation.

In the above example, explanations have so far been made about the model vehicle C as the operated object. The present invention can also be applied to other operated objects such as a doll, a robot, or a model airplane. Further, in the above-described example, only a series of operations can be stored. It is also possible to store two or more series of operations to thereby selectively call them up. It is also possible to arrange the memory 72 in a manner detachable from the controller 1 so that it can be replaced for one with a larger capacity or so that a memory containing therein a series of operations can be mounted on the controller 1. Further, in the above-described example, the controller 1 is shown to be of a table-top type, but it may also be arranged to be of a portable type.

As can be seen from the above explanations, according to the present invention, the controller has added thereto a programing function. Therefore, it is possible to cause the operated object to perform complicated movements without changing the design of a conventional operated object.

It is readily apparent that the above-described controller meets all of the objects mentioned above and also has the advantage of wide commercial utility. It should be understood that the specific form of the invention herein above described is intended to be representative only, as certain modifications within the scope of these teachings will be apparent to those skilled in the art.

Accordingly, reference should be made to the following claims in determining the full scope of the invention.

What is claimed is:

1. A controller for use with an operated object having a movable part and a receiver contained therein, said controller comprising:

a housing;

a control means in the housing for wirelessly operating the operated object by transmitting a signal to the receiver; and a memory means in the housing for storing in advance a signal, generated by the control means, wherein the signal is transmitted to said receiver, said signal stored in said memory means being adapted to be transmitted to the receiver to perform an automatic control mode for controlling the movable part of the operated body.

2. The controller according to claim 1, further comprising a manual operation unit for performing a manual operation mode in which the movable part of the operated body is sequentially controlled, wherein said memory means stores a signal in a form of a manual operation procedure by said manual operation unit, said signal in the form of said manual operation mode being adapted to be transmitted to the receiver to perform a reproducing mode in which an operation at the time of manual operation mode is reproduced.

3. The controller according to claim 2, further comprising a display unit for displaying the signal stored in said memory means without transmitting the signal to the receiver, thereby performing a simulation mode in which a content of the signal is confirmed by displaying.

4. The controller according to claim 1, further comprising a display unit for displaying the signal stored in said memory means without transmitting the signal to the receiver, thereby performing a simulation mode in which a content of the signal is confirmed by displaying.

5. A controller operatively connected to a movable device, the controller comprising:

a housing;

a transmitting means in the housing for wirelessly transmitting a plurality of signals to a receiver disposed on the movable device;

a control means in the housing for controlling the plurality of signals; and a memory means in the housing for storing the plurality of signals transmitted to the receiver, wherein the stored plurality of signals are transmitted to the receiver to provide an automatic control mode for controlling the movable device.

6. The controller according to claim 5, further comprising a manual operation unit for performing a manual operation mode in which the movable device is sequentially controlled, wherein the memory means stores the plurality of signals in a manual operation procedure by the manual operation mode, the plurality of signals are adapted to be transmitted to the receiver to perform a reproducing mode in which an operation at the time of manual operation mode is reproduced.

7. The controller according to claim 6, further comprising a display unit for displaying the signal stored in the memory means without transmitting the signal to the receiver, thereby performing a simulation mode in which a content of the signal is confirmed by displaying.

8. The controller according to claim 5, further comprising a display unit for displaying the plurality of signals stored in the memory means without transmitting the plurality of signals to the receive, thereby performing a simulation mode in which a content of the signal is confirmed by displaying.

* * * * *